(12) United States Patent
Xiao et al.

(10) Patent No.: US 10,950,846 B2
(45) Date of Patent: Mar. 16, 2021

(54) METHOD FOR IN SITU GROWTH OF AXIAL GEOMETRY CARBON STRUCTURES IN ELECTRODES

(71) Applicant: GM GLOBAL TECHNOLOGY OPERATIONS LLC, Detroit, MI (US)

(72) Inventors: Xingcheng Xiao, Troy, MI (US); Mark W. Verbrugge, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 65 days.

(21) Appl. No.: 16/239,027

(22) Filed: Jan. 3, 2019

(65) Prior Publication Data
US 2020/0220153 A1    Jul. 9, 2020

(51) Int. Cl.
*H01M 4/04*   (2006.01)
*H01M 4/1393*  (2010.01)
*H01M 4/139*   (2010.01)
*H01M 4/62*    (2006.01)
*H01M 4/1395*  (2010.01)
(Continued)

(52) U.S. Cl.
CPC ....... *H01M 4/0471* (2013.01); *H01M 4/0404* (2013.01); *H01M 4/134* (2013.01); *H01M 4/1395* (2013.01); *H01M 4/386* (2013.01); *H01M 4/625* (2013.01); *H01M 10/0525* (2013.01)

(58) Field of Classification Search
None
See application file for complete search history.

(56) References Cited

U.S. PATENT DOCUMENTS

| 8,440,350 B1 | 5/2013 | Verbrugge et al. |
| 8,603,683 B2 | 12/2013 | Park et al. |

(Continued)

FOREIGN PATENT DOCUMENTS

| CN | 111403733 A | 7/2020 |
| DE | 102019135154 A1 | 7/2020 |

OTHER PUBLICATIONS

Halalay, Ion et al., U.S. Appl. No. 16/160,799, filed Oct. 15, 2018 entitled, "Method for Making Silicon-Containing Composite Electrodes for Lithium-Based Batteries," 47 pages.

*Primary Examiner* — Yoshitoshi Takeuchi
(74) *Attorney, Agent, or Firm* — Harness, Dickey & Pierce, P.L.C.

(57) ABSTRACT

Methods of forming a plurality of axial geometry carbon structures (e.g., carbon nanotubes or carbon fibers) in situ in an electrode of an electrochemical cell that cycles lithium ions are provided. Electroactive particles that undergo volumetric expansion are mixed with a polymer precursor and a plurality of catalytic nanoparticles comprising a metal selected from the group consisting of: iron, nickel, cobalt, alloys, and combinations thereof to form a substantially homogeneous slurry. The slurry is applied to a substrate and then heated in an environment having a temperature of ≤about 1000° C. and in certain aspects, ≤about 895° C. to pyrolyze the polymer precursor. The plurality of catalytic nanoparticles facilitates in situ precipitation of carbon to grow a plurality of axial geometry carbon structures. After the heating, the electrode includes an electrically conductive carbonaceous porous network comprising the plurality of electroactive particles and the plurality of axial geometry carbon structures.

19 Claims, 3 Drawing Sheets

(51) Int. Cl.
*H01M 10/0525* (2010.01)
*H01M 4/134* (2010.01)
*H01M 4/38* (2006.01)

(56) References Cited

U.S. PATENT DOCUMENTS

| | | |
|---|---|---|
| 8,859,144 B2 | 10/2014 | Xiao |
| 8,999,584 B2 | 4/2015 | Jiang et al. |
| 9,005,811 B2 | 4/2015 | Xiao et al. |
| 9,093,830 B2 | 7/2015 | Krieg et al. |
| 9,142,830 B2 | 9/2015 | Xiao et al. |
| 9,178,208 B2 | 11/2015 | Park et al. |
| 9,302,914 B2 | 4/2016 | Liu et al. |
| 9,362,551 B2 | 6/2016 | Sachdev et al. |
| 9,379,374 B2 | 6/2016 | Liu et al. |
| 9,397,338 B2 | 7/2016 | Park et al. |
| 9,531,004 B2 | 12/2016 | Xiao et al. |
| 9,553,303 B2 | 1/2017 | Park et al. |
| 9,564,639 B2 | 2/2017 | Huang |
| 9,570,752 B2 | 2/2017 | Huang et al. |
| 9,577,251 B2 | 2/2017 | Xiao et al. |
| 9,583,757 B2 | 2/2017 | Park et al. |
| 9,620,809 B2 | 4/2017 | Turon Teixidor et al. |
| 9,647,259 B2 | 5/2017 | Park et al. |
| 9,780,361 B2 | 10/2017 | Xiao et al. |
| 9,806,328 B2 | 10/2017 | Park et al. |
| 10,062,898 B2 | 8/2018 | Xiao |
| 2010/0136225 A1* | 6/2010 | Lal .............. B22F 3/22 427/122 |
| 2014/0113199 A1* | 4/2014 | Zhang ............. H01M 4/386 429/231.8 |
| 2017/0040598 A1 | 2/2017 | Wang et al. |
| 2018/0083268 A1 | 3/2018 | Huang |
| 2018/0205114 A1 | 7/2018 | Pauric et al. |
| 2020/0020948 A1 | 1/2020 | Huang et al. |
| 2020/0020949 A1 | 1/2020 | Huang |
| 2020/0119339 A1 | 4/2020 | Halalay et al. |
| 2020/0127292 A1 | 4/2020 | Halalay et al. |

\* cited by examiner

METHOD FOR IN SITU GROWTH OF AXIAL GEOMETRY CARBON STRUCTURES IN ELECTRODES

INTRODUCTION

This section provides background information related to the present disclosure which is not necessarily prior art.

High-energy density, electrochemical cells, such as lithium ion batteries can be used in a variety of consumer products and vehicles, such as Hybrid Electric Vehicles (HEVs) and Electric Vehicles (EVs). Typical lithium ion batteries comprise a first electrode (e.g., a positive electrode or cathode), a second electrode (e.g., a negative electrode or anode), an electrolyte material, and a separator. Cathode materials for lithium batteries typically comprise an electroactive material which can be intercalated with lithium ions, such as lithium-transition metal oxides or mixed oxides of the spinel type, for example including spinel $LiMn_2O_4$, $LiCoO_2$, $LiNiO_2$, $LiMn_{1.5}Ni_{0.5}O_4$, $LiNi_{(1-x-y)}Co_xM_yO_2$ (where $0<x<1$, $y<1$, and M may be Al, Mn, or the like), or lithium iron phosphates.

The negative electrode typically includes a lithium insertion material or an alloy host material. Typical electroactive materials for forming an anode include lithium-graphite intercalation compounds, lithium-silicon insertion compounds, lithium-tin insertion compounds, or lithium alloys. While graphite compounds are most common, recently, anode materials with high specific capacity (in comparison with conventional graphite) are of growing interest. Silicon has the highest known theoretical charge capacity for lithium, making it one of the most promising materials for rechargeable lithium ion batteries. However, current anode materials comprising silicon suffer from significant drawbacks. Silicon-containing electroactive materials experience large volume changes (e.g., volume expansion/contraction), for example, at about 300%, during lithium insertion/extraction (e.g., intercalation and deintercalation) that can result in cracking of the anode, a decline of electrochemical cyclic performance and diminished Coulombic charge capacity (capacity fade), and extremely limited cycle life.

It would be desirable to develop high performance negative electrode materials comprising silicon for use in high power lithium ion batteries, which overcome the current shortcomings that prevent their widespread commercial use, especially in vehicle applications.

SUMMARY

This section provides a general summary of the disclosure, and is not a comprehensive disclosure of its full scope or all of its features.

In various aspects, the present disclosure contemplates methods of forming a plurality of axial geometry carbon structures in situ in an electrode for an electrochemical cell that cycles lithium ions. In one variation, the method includes mixing a plurality of electroactive particles that undergo volumetric expansion within the electrode as the electrochemical cell cycles lithium ions with a polymer precursor, and a plurality of catalytic nanoparticles. The catalytic nanoparticles may include a metal selected from the group consisting of: iron, nickel, cobalt, alloys, and combinations thereof to form a substantially homogeneous slurry. The slurry is applied to a substrate. Then, the slurry is heated in an environment having a temperature of less than or equal to about 895° C. to pyrolyze the polymer precursor. During the heating, the plurality of catalytic nanoparticles facilitates precipitation of carbon to grow a plurality of axial geometry carbon structures. After the heating, the electrode includes an electrically conductive carbonaceous porous network including the plurality of electroactive particles and the plurality of axial geometry carbon structures.

In one aspect, the temperature is greater than or equal to about 500° C. to less than about 700° C.

In one aspect, the method further includes cross-linking or curing the polymer precursor after the applying, but prior to the heating.

In one aspect, the slurry is substantially free of electrically conductive particles aside from the plurality of catalytic nanoparticles.

In one aspect, the electroactive particles include silicon.

In one aspect, the electroactive material is selected from the group consisting of: Si, SiSn, SiSnFe, SiSnAl, SiFeCo, $SiO_x$, and combinations thereof.

In one aspect, the polymer precursor includes polyimide, polyacrylonitrile, poly(methyl methacrylate), polyvinylidene fluoride, sodium alginate, lithium alginate, and combinations thereof.

In one aspect, the catalytic nanoparticle includes a transition metal salt selected from the group consisting of: $FeSO_4$, $FeCl_3$, $Fe(NO_3)$, $FeMoO_4$, $Fe(ClO_4)_2$, $Fe_4(P_2O_7)_3$, $NiSO_4$, $NiCl_3$, $Ni(ClO_4)_2$, $CoCl_2$, $CoSO_4$, $Co_3(PO_4)_2$, $CoF_3$, $Co(ClO_4)_2$, and combinations thereof.

In one aspect, the catalytic nanoparticle includes iron.

In one aspect, the environment is a reducing atmosphere including a hydrocarbon.

In one aspect, the reducing atmosphere includes methane or acetylene.

In one aspect, the plurality of axial geometry carbon structures include a structure selected from the group consisting of: carbon fibers, carbon nanotubes, and combinations thereof.

In one aspect, the electrically conductive network includes greater than or equal to about 30% by weight to 90% by weight of electroactive particles and greater than 0% by weight to less than or equal to about 10% by weight of the axial geometry carbon structures.

In one aspect, the plurality of electroactive particles has an average particle size diameter of greater than or equal to about 50 nm to 20 micrometers. Further, the plurality of catalytic nanoparticles has an average particle size diameter of greater than or equal to about 2 nm to less than or equal to about 100 nm.

In one aspect, the slurry consists essentially of the plurality of electroactive particles, the polymer precursor(s), and the plurality of catalytic nanoparticles.

In another variation, the present disclosure provides a method of forming a plurality of axial geometry carbon structures in situ in a negative electrode for an electrochemical cell that cycles lithium ions that includes mixing a plurality of electroactive particles including silicon (Si), one or more polymer precursors, and a plurality of catalytic nanoparticles including a metal selected from the group consisting of: iron, nickel, cobalt, alloys, and combinations thereof to form a substantially homogeneous slurry. The slurry is applied to a current collector. The slurry is heated in a reducing environment having a temperature of less than or equal to about 895° C. to pyrolyze the polymer precursor so that the plurality of catalytic nanoparticles facilitates precipitation of carbon to grow a plurality of axial geometry carbon structures. After the heating, the negative electrode includes an electrically conductive carbonaceous porous network including the plurality of electroactive particles and the plurality of axial geometry carbon structures formed on the current collector.

In one aspect, the environment is a reducing atmosphere including a hydrocarbon.

In one aspect, the method further includes cross-linking or curing the polymer precursor after the applying, but prior to the heating.

In one aspect, the substantially homogeneous slurry consists essentially of the plurality of electroactive particles including silicon (Si), the one or more polymer precursors, and the plurality of catalytic nanoparticles.

In yet other variations, the present disclosure provides a method of forming a plurality of axial geometry carbon structures in situ in an electrode for an electrochemical cell that cycles lithium ions. The method includes mixing a plurality of electroactive particles that undergo volumetric expansion within the electrode as the electrochemical cell cycles lithium ions, a polymer precursor, and a plurality of catalytic nanoparticles including a metal selected from the group consisting of: iron, cobalt, alloys, and combinations thereof to form a substantially homogeneous slurry. The slurry is applied to a substrate. The slurry is heated in an environment having a temperature of less than or equal to about 1,000° C. to pyrolyze the polymer precursor. The plurality of catalytic nanoparticles facilitates precipitation of carbon to grow a plurality of axial geometry carbon structures. After the heating, the electrode includes an electrically conductive carbonaceous porous network including the plurality of electroactive particles and the plurality of axial geometry carbon structures.

In one aspect, the substantially homogeneous slurry consists essentially of the plurality of electroactive particles including silicon (Si), the one or more polymer precursors, and the plurality of catalytic nanoparticles.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
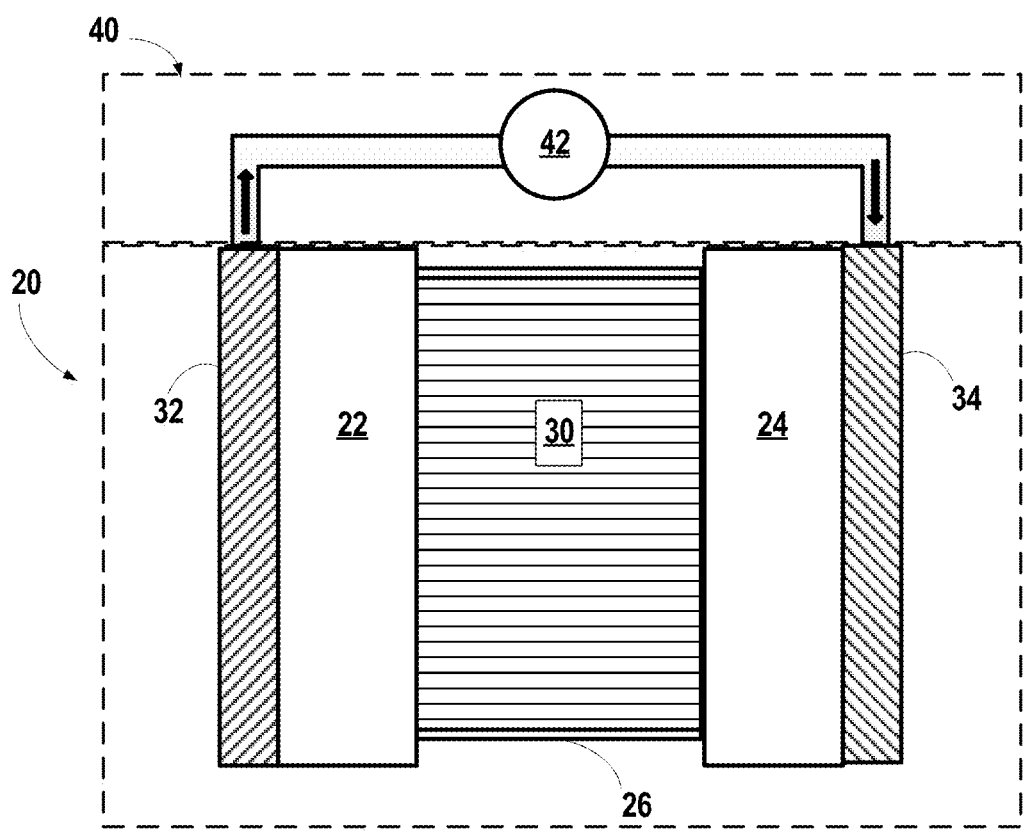
FIG. 1 shows an example of an electrochemical cell that cycles lithium.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present technology pertains to electrochemical cells that cycle lithium ions, including lithium ion batteries. In various instances, such electrochemical cells may be used in automotive transportation applications. However, the present technology may be employed in a wide variety of other applications. In certain aspects, the present disclosure provides a method of forming an electrode for an electrochemical cell having an electroactive material that experiences substantially large volumetric expansion during lithiation or delithiation. As will be described further herein, such an electroactive material may be a silicon-containing electroactive material for use in a negative electrode. By way of background, batteries incorporating electroactive materials that experience significant volumetric expansion and contraction during lithiation and delithiation have a higher energy density, potentially doubling storage capacity and halving the size of the battery, while maintaining a similar cycle life as other lithium ion batteries. However, batteries incorporating such materials also have potential downsides in some instances. For example, anodes comprising silicon or other expandable materials may experience volumetric expansion and contraction during successive charging and discharging cycles. Such volumetric changes may lead to fatigue cracking and decrepitation of the electroactive material in the electrode, which in turn may cause a loss of electrical contact between the electroactive material and the rest of the battery cell resulting in poor capacity retention and premature cell failure.

Accordingly, it would be desirable to develop materials and methods that successfully use silicon-containing or other similar materials that expand and contract as an electroactive material in commercial lithium ion batteries, especially for transportation application. In particular, it would be desirable that such materials can accommodate volumetric expansion and contraction of the electroactive material, while substantially maintaining functionality of the electrode.

The present disclosure provides a method of forming a plurality of axial geometry carbon structures in situ in such an electrode for an electrochemical cell that cycles lithium ions. The electrodes having the plurality of axial geometry carbon structures formed in situ in accordance with the methods provided herein demonstrate enhanced performance of the electrochemical cell over time.

An exemplary schematic illustration of an electrochemical cell (also referred to as the battery) that cycles lithium ions is shown in FIG. 1. The battery 20 includes a negative electrode 22, a positive electrode 24, and a separator 26 (e.g., a microporous polymeric separator) disposed between the two electrodes 22, 24. The separator 26 comprises an electrolyte 30, which may also be present in the negative electrode 22 and positive electrode 24. A negative electrode current collector 32 may be positioned at or near the negative electrode 22 and a positive electrode current collector 34 may be positioned at or near the positive electrode 24. The negative electrode current collector 32 and positive electrode current collector 34 respectively collect and move free electrons to and from an external circuit 40. An interruptible external circuit 40 and load device 42 connects the negative electrode 22 (through its current collector 32) and the positive electrode 24 (through its current collector 34).

The battery 20 can generate an electric current during discharge by way of reversible electrochemical reactions that occur when the external circuit 40 is closed (to connect the negative electrode 22 and the positive electrode 24) and the negative electrode 22 contains a relatively greater quantity of lithium than the positive electrode. The chemical potential difference between the positive electrode 24 and the negative electrode 22 drives electrons produced by the oxidation of intercalated lithium at the negative electrode 22 through the external circuit 40 toward the positive electrode 24. Lithium ions, which are also produced at the negative electrode, are concurrently transferred through the electrolyte solution 30 contained in the separator 26 towards the positive electrode 24. The electrons flow through the external circuit 40 and the lithium ions migrate across the separator 26 containing the electrolyte solution 30 to form intercalated lithium at the positive electrode 24. The electric current passing through the external circuit 40 can be harnessed and directed through the load device 42 until the intercalated lithium in the negative electrode 22 is depleted and the capacity of the battery 20 is diminished.

The battery 20 can be charged or re-energized at any time by connecting an external power source to the lithium ion battery 20 to reverse the electrochemical reactions that occur during battery discharge. The connection of an external electrical energy source to the battery 20 compels the otherwise non-spontaneous oxidation of intercalated lithium at the negative electrode 22 to produce electrons and lithium ions. The electrons, which flow back towards the positive electrode 24 through the external circuit 40, and the lithium ions, which are carried by the electrolyte solution 30 across the separator 26 back towards the positive electrode 24, reunite at the positive electrode 24 and replenish it with lithium for use during the next battery discharge event. As such, a complete discharging event followed by a complete charging event is considered to be a cycle, where lithium ions are cycled between the positive electrode 24 and the negative electrode 22. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator.

In many lithium ion battery configurations, each of the negative electrode current collector 32, negative electrode 22, the separator 26, positive electrode 24, and positive electrode current collector 34 are prepared as relatively thin layers (for example, from several microns to a fraction of a millimeter or less in thickness) and assembled in layers connected in electrical parallel arrangement to provide a suitable electrical energy and power package. Further, the separator 26 operates as an electrical insulator by being sandwiched between the negative electrode 22 and the positive electrode 24 to prevent physical contact and thus, the occurrence of a short circuit. The separator 26, in addition to providing a physical barrier between the two electrodes 22, 24, acts like a sponge that contains the electrolyte solution in a network of open pores during the cycling of lithium ions, to facilitate functioning of the battery 20.

The battery 20 can include a variety of other components that while not depicted here are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26. As noted above, the size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium ion cells or batteries to produce a greater voltage output, energy, and power if it is required by the load device 42.

Accordingly, the battery 20 can generate electric current to a load device 42 that is part of the external circuit 40. The load device 42 may be powered by the electric current passing through the external circuit 40 when the battery 20 is discharging. While the electrical load device 42 may be any number of known electrically powered devices, a few specific examples include an electric motor for an electrified vehicle, a laptop computer, a tablet computer, a cellular phone, and cordless power tools or appliances. The load device 42 may also be an electricity-generating apparatus that charges the battery 20 for purposes of storing electrical energy.

The positive electrode 24 may be formed from a lithium-based active material that can sufficiently undergo lithium intercalation and deintercalation, or alloying and dealloying, while functioning as the positive terminal of the battery 20. One exemplary common class of known materials that can be used to form the positive electrode 24 is layered lithium transitional metal oxides. For example, in certain aspects, the positive electrode 24 may comprise one or more materials having a spinel structure, such as lithium manganese oxide ($Li_{(1+x)}Mn_2O_4$, where $0.1 \leq x \leq 1$), lithium manganese nickel oxide ($LiMn_{(2-x)}Ni_xO_4$, where $0 \leq x \leq 0.5$) (e.g., $LiMn_{1.5}Ni_{0.5}O_4$); one or more materials with a layered structure, such as lithium cobalt oxide ($LiCoO_2$), lithium nickel manganese cobalt oxide ($Li(Ni_xMn_yCo_z)O_2$, where $0 \leq x \leq 1$, $0 \leq y \leq 1$, $0 \leq z \leq 1$, and $x+y+z=1$) (e.g., $LiMn_{0.33}Ni_{0.33}Co_{0.33}O_2$), or a lithium nickel cobalt metal oxide ($LiNi_{(1-x-y)}Co_xM_yO_2$, where $0<x<0.2$, $y<0.2$, and M may be Al, Mg, Ti, or the like); or a lithium iron polyanion oxide with olivine structure, such as lithium iron phosphate ($LiFePO_4$), lithium manganese-iron phosphate ($LiMn_{2-x}Fe_xPO_4$, where $0<x<0.3$), or lithium iron fluorophosphates ($Li_2FePO_4F$).

In certain variations, the positive active materials may be intermingled with an electronically conducting material that provides an electron conduction path, electrically conductive materials, and/or at least one polymeric binder material that improves the structural integrity of the electrode.

In various aspects, the porous separator 26 may include, in certain instances, a microporous polymeric separator including a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP, or multi-layered structured porous films of PE and/or PP. Furthermore, the porous separator 26 may be mixed with a ceramic material or its surface may be coated in a ceramic material. For example, a ceramic coating may include alumina ($Al_2O_3$), silicon dioxide ($SiO_2$), titania ($TiO_2$), or combinations thereof. Commercially available polyolefin porous membranes include CELGARD® 2500 (a monolayer polypropylene separator) and CELGARD® 2320 (a trilayer polypropylene/polyethylene/polypropylene separator) available from Celgard LLC.

In various aspects, the negative electrode 22 includes an electroactive material that may be a lithium host material capable of functioning as a negative terminal of a lithium ion battery. Notably, the present technology is particularly suitable for use with negative electrode (anode) electroactive materials for lithium ion batteries that undergo substantial volumetric changes during operation of the battery. The negative electrode 22 may thus include the electroactive lithium host material that experiences volumetric expansion and contraction as lithium cycles during operation of the electrochemical cell/battery 20. In certain aspects, the negative electrode materials for the negative electrode 22 comprise silicon-based materials. As noted above, anode active materials comprising silicon have the highest known theoretical charge capacity for lithium, which makes them quite desirable for use in rechargeable lithium ion batteries. For example, Si-based electrodes have been considered for high-performance applications (EVs/HEVs) due to their high specific capacity and energy density materials.

However, in practice, conventional anode materials comprising silicon suffer from significant drawbacks. Such silicon-containing materials show large volume changes (e.g., volume expansion/contraction) during lithium insertion/extraction (e.g., intercalation and deintercalation) resulting in cracking of the anode, a decline of electrochemical cyclic performance and diminished Coulombic charge capacity (capacity fade), and extremely limited cycle life. In particular, capacity fading for silicon-based anodes has been challenging and a barrier to their widespread use in lithium ion batteries.

Thus, in accordance with certain aspects of the present disclosure, the negative electrode 22 comprises an active anode material comprising silicon. Such a material may be silicon (capable of intercalating lithium) or may be lithium-silicon and silicon containing binary and ternary alloys, such as SiSn, SiSnFe, SiSnAl, SiFeCo, and the like. The electroactive material may also include silicon oxide ($SiO_x$). In certain embodiments, the silicon containing electroactive material comprises or consists essentially of silicon (rather than compounds or alloys of silicon).

Conventionally, the negative electrode may contain one or more polymeric binder materials to hold the lithium host material together structurally. Thus, the anode active material (electroactive material) may be in the form of particles that are intermingled within a binder material. Thus, electrodes can be made from electroactive materials, like silicon, which are then combined with a binder material selected from the group consisting of: polyvinylidene difluoride (PVDF), a nitrile butadiene rubber (NBR), carboxymethoxyl cellulose (CMC), and combinations thereof, by way of non-limiting example, which form the negative electrode 22. The negative electrode current collector 32 may be formed from copper or any other appropriate electrically conductive material known to those of skill in the art.

In alternative aspects, the negative electrode may also optionally contain an electrically conductive material distributed within the binder along with the anode active material. In certain alternative variations, the electroactive materials and electrically conductive material may be distributed in a conductive porous matrix. For example, negative electrodes may be formed with silicon-containing active materials by distributing the active material particles and electrically conductive materials, such as carbon-containing particles (e.g., carbon nanotubes (CNTs), carbon nanofibers (CNFs)) or metal particles, in one or more polymeric binders. CNTs and CNFs may also be added to an electrode slurry used to form the electrode to enhance the mechanical strength and flexibility of the electrode that is ultimately formed. This slurry mixture may then be pyrolyzed at high temperatures, for example, at greater than 900° C. so that the polymeric binders form a porous carbonized matrix in which the electroactive material particles and electrically conductive particles are distributed. High-temperature pyrolysis (greater than 900° C. up to 1,350° C.) is required to fully convert the polymer into conductive carbon, which leads to large amount of energy consumption. In addition, such high temperatures can cause a thick silicon carbide (SiC) interface to form between the silicon-based particles and other active materials in the electrode, potentially leading to higher internal resistance and loss of Si active materials.

When such a process uses axial geometry electrically conductive particles, like carbon nanotubes or carbon nanofibers, significant processing issues can arise. These carbon nanotubes and carbon nanofibers are difficult to mix evenly in the high viscosity precursor slurry prior to pyrolysis. For example, carbon nanotubes and carbon nanofibers are known to be very difficult to distribute evenly in a high viscosity mixture, like a slurry-based electrode precursor. The final electrode formed by such a process may thus have an uneven distribution of electrically conductive axial geometry carbon-containing particles resulting in performance instability and localized regions that can exhibit mechanical weakness, which significantly diminishes the ability to use electroactive materials that undergo volumetric expansion during lithium cycling in a battery. However, adding carbon nanotubes or nanofibers enhances the mechanical stability of Si based electrodes having fast charge capability.

In various aspects, the present disclosure provides methods of forming electrodes comprising an electrically conductive carbonaceous network having a plurality of axial geometry carbon structures formed in situ within the network/matrix phase around the electroactive materials. For example, such a method of forming an electrode for an electrochemical cell that cycles lithium ions may include mixing a plurality of electroactive particles that undergo volumetric expansion during the cycling of lithium ions (like silicon, as described above), with a polymer precursor, and a plurality of catalytic nanoparticles. In certain aspects, the polymer precursor comprises polyimide, polyacrylonitrile, poly(methyl methacrylate), polyvinylidene fluoride, sodium alginate, lithium alginate, and combinations thereof.

In certain aspects, the catalytic nanoparticles comprise a metal selected from the group consisting of: iron, nickel, cobalt, alloys, and combinations thereof. In certain variations, the catalytic nanoparticles comprise a metal selected from the group consisting of: iron, cobalt, alloys, and combinations thereof. In one variation, the plurality of catalytic nanoparticles comprises iron. In certain variations, the catalytic nanoparticles may comprise a transition metal salt. For example, suitable transition metal salts may be selected from the group consisting of: $FeSO_4$, $FeCl_3$, $Fe(NO_3)$, $FeMoO_4$, $Fe(ClO_4)_2$, $Fe_4(P_2O_7)_3$, $NiSO_4$, $NiCl_3$, $Ni(ClO_4)_2$, $CoCl_2$, $CoSO_4$, $Co_3(PO_4)_2$, $CoF_3$, $Co(ClO_4)_2$, and combinations thereof. By "nanoparticle," it is meant that that particle is "nano-sized" or "nanometer-sized" and has at least one spatial dimension that is less than about 1 μm (i.e., 1,000 nm), optionally less than about 0.5 μm (i.e., 500 nm), optionally less than about 0.25 μm (i.e., 250 nm), optionally less than about 0.1 μm (i.e., 100 nm), optionally less than about 75 nm, and in certain variations, optionally less than about 50 nm. Accordingly, a nanoparticle component has at least one spatial dimension that is greater than about 2 nm and less than about 100 nm. It should be noted that so long as at least one dimension of the nanoparticle falls within the above-described nano-sized scale (for example, diameter), one or more other axes may well exceed the nano-size (for example, length and/or width). In certain variations, the catalytic nanoparticles generally have a round shape.

The plurality of catalytic nanoparticles, electroactive particles, and the polymer precursor are mixed together to form a substantially homogeneous slurry. In certain aspects, the catalytic nanoparticles are substantially homogeneously distributed within the slurry. By substantially homogenous mixture, it is meant that the various components are evenly distributed as practicable in a manufacturing setting, so that any detrimental electrode performance attributable to localized inhomogeneities are avoided. In certain variations, aside from the plurality of catalytic nanoparticles, the slurry is substantially free of electrically conductive particles.

Figure 2:
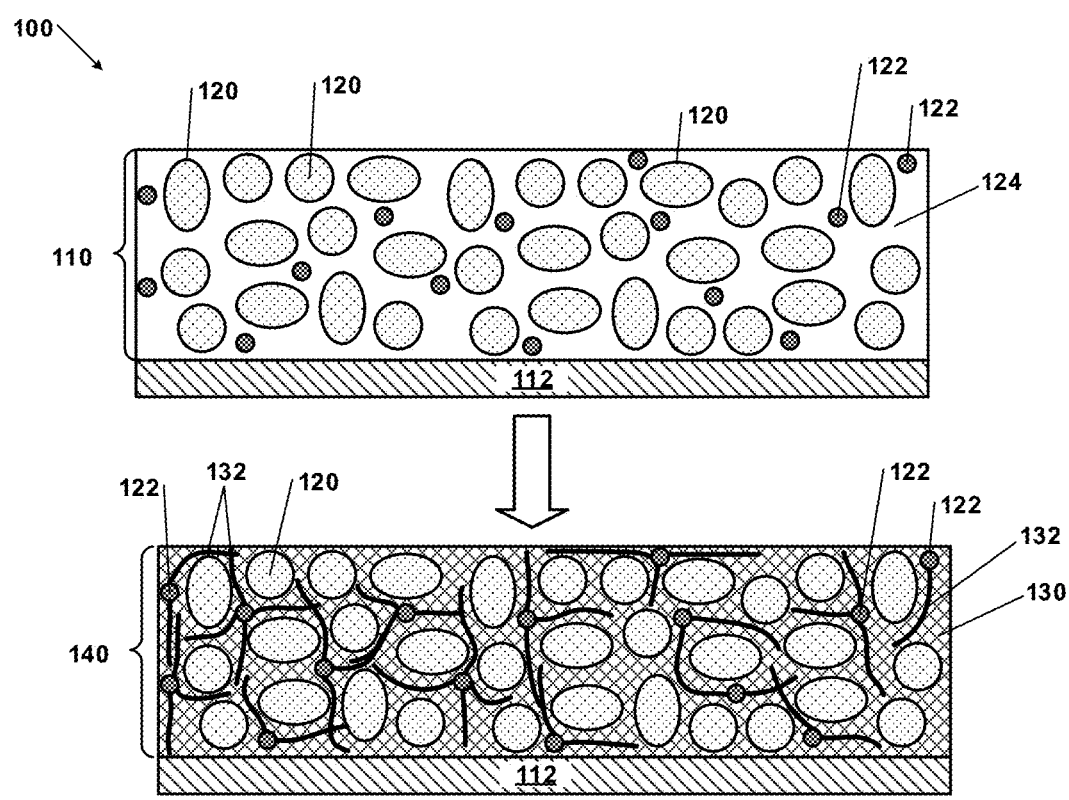
FIG. 2 shows an example of methods according to certain aspects of the present disclosure where a slurry is applied to a substrate and then pyrolyzed to form an electrode having a plurality of axial geometry carbon structures distributed through a carbonaceous electrically conductive matrix.

With reference to FIG. 2, an electrode precursor 100 includes a slurry 110 that is applied to a substrate 112. The substrate 112 may be a temporary, sacrificial substrate or may be a current collector on which the electrode is formed. For example, the slurry 110 may be cast on a copper current collector in a one-step process or onto a sacrificial support, such as an aluminum mesh or foil. The slurry 110 includes a plurality of electroactive particles 120, a plurality of catalytic nanoparticles 122, and a polymer precursor 124, which may be homogeneously mixed together. In certain variations, the substantially homogeneous slurry consists essentially of the plurality of electroactive particles comprising silicon (Si), the one or more polymer precursors, and the plurality of catalytic nanoparticles, meaning that other minor additives or components that may be added that do not alter the performance or functionality of the electrode.

In certain aspects, the slurry comprises greater than or equal to about 30% by weight to 90% by weight of electroactive particles in the electrode, greater than 0.5% by weight to less than or equal to about 5% by weight of the catalytic nanoparticles in the electrode, and a balance of the polymer precursor 124, such as for example, greater than or equal to about 10% by weight to 60% by weight of the polymeric precursor.

The slurry 110 may then be heated in an environment (e.g., having a temperature of less than about 1,000° C. as described below) to pyrolyze the polymer precursor 124 to form a carbonaceous conductive porous matrix 130. The carbonaceous conductive porous matrix 130 is electrically conductive. In this process, the plurality of catalytic nanoparticles 122 facilitates localized precipitation of carbon from the polymer precursor 124, so that the carbon grows and forms a plurality of axial geometry carbon structures 132. More specifically, the catalytic nanoparticles 122 can serve as nucleation sites to grow a plurality of axial geometry carbon structures 132, like carbon nanotubes or carbon nanofibers in situ, thus improving the mechanical integrity and flexibility of an electrode 140 formed.

In various aspects, the temperature during the heating/ pyrolysis is less than or equal to about 1,000° C., optionally less than or equal to about 950° C., and in certain variations, optionally less than or equal to about 900° C. Such pyrolysis temperatures may be suitable where the catalytic nanoparticles comprise iron, cobalt, or alloys and combinations thereof. In certain aspects, for example, where the catalytic nanoparticles comprise iron, nickel, cobalt, and alloys and combinations thereof, the temperature during the heating/ pyrolysis is less than or equal to about 895° C., optionally less than or equal to about 875° C., optionally less than or equal to about 850° C., optionally less than or equal to about 825° C., optionally less than or equal to about 800° C., optionally less than or equal to about 775° C., optionally less than or equal to about 750° C., optionally less than or equal to about 725° C., optionally less than or equal to about 700° C. In certain aspects, the temperature may be greater than or equal to about 500° C. to less than about 700° C. for the pyrolysis reaction. Due to the presence of the catalytic nanoparticles 122, the temperature for pyrolysis may be substantially reduced from other comparative methods. However, the temperatures used during the process are high enough to convert transitional metal ions into metallic nanoparticles when transition metal salts are used as precursors of the catalytic nanoparticles. Notably, the lower pyrolysis temperature can lead to less inactive material being formed, for example, where the electroactive material comprises silicon, less silicon carbide (SiC) is formed on the silicon active material surface and thus mitigating increased formation of a lithium-ion diffusion barrier at the Si—C interface.

The electrode 140 thus comprises the axial geometry carbon structures 132 after heating and pyrolysis. The electrode further includes the electrically conductive carbonaceous network 130 comprising the plurality of electroactive particles 120 and the plurality of catalytic nanoparticles 122. The electrode 140 is thus a composite electrode comprising a matrix of the carbonaceous conductive porous matrix 130 having a plurality of axial geometry carbon structures 132, electroactive particles 120, and catalyst nanoparticles 122 distributed evenly therein.

Axial geometry particles are anisotropic and have a cylindrical, rod, tube, or fibrous shape with an evident elongated longitudinal axis, which is longer than the other dimensions (e.g., diameter or width), thus having an axial anisotropic geometry. Generally, an aspect ratio (AR) for cylindrical shapes (e.g., a tube, fiber, wire, rod, etc.) is defined as AR=L/D, where L is the length of the longest axis (here the major longitudinal axis) and D is the diameter of the tube/cylinder. Suitable axial geometry particles formed by the present technology generally have high aspect ratios, for example, ranging from at least about 100 to in excess of 1,000, for example. In yet other aspects, such axial geometry particles may have an aspect ratio of 5,000 or more and in certain variations 10,000 or more.

In certain aspects, the plurality of axial geometry carbon structures 132 thus formed from such methods may be selected from the group consisting of: carbon fibers, carbon nanotubes, and combinations thereof. In certain variations, the axial geometry carbon structures 132 may be nanotubes having a hollow center, such as single walled carbon nanotubes or multi-walled carbon nanotubes or may instead be a solid carbon nanofiber. It should be noted that the axial geometry carbon structures are formed within open pores of the carbonaceous conductive matrix and thus may not form a particle with a single uniform shape, but rather, may be elongated and generally formed occupying select open pore regions within the carbonaceous matrix in regions near each catalytic nanoparticle (where growth of the conductive axial geometry particle initiates).

In certain aspects, the method further comprises cross-linking or curing the polymer precursor after the applying, but prior to the heating, to form a cross-linked polymer that is then pyrolyzed. For example, the slurry may be cast onto a substrate and then the polymer precursor may be cured or cross-linked at a low temperature, for example, at greater than or equal to about 30° C. to less than or equal to about 300° C. In other variations, the curing or cross-linking may involve exposing the polymer precursor to actinic radiation (UV light) or e-beam energy.

In certain other aspects, as noted above, the environment is a reducing atmosphere comprising a hydrocarbon. By way of example, the reducing atmosphere may comprise methane ($CH_4$), acetylene ($C_2H_2$), or combinations thereof. The growth of the plurality of axial geometry carbon structures that grow during the pyrolysis can be controlled by controlling the temperature, for example, in a reducing atmosphere. The plurality of axial geometry carbon structures (CNTs/ CNFs) can grow after the pyrolysis by controlling the temperature and introducing the hydrocarbon precursors, such as $CH_4$ or $C_2H_2$. In certain other aspects, the environment may be an inert environment, for example, containing argon and/or helium, and the like.

Figure 3:
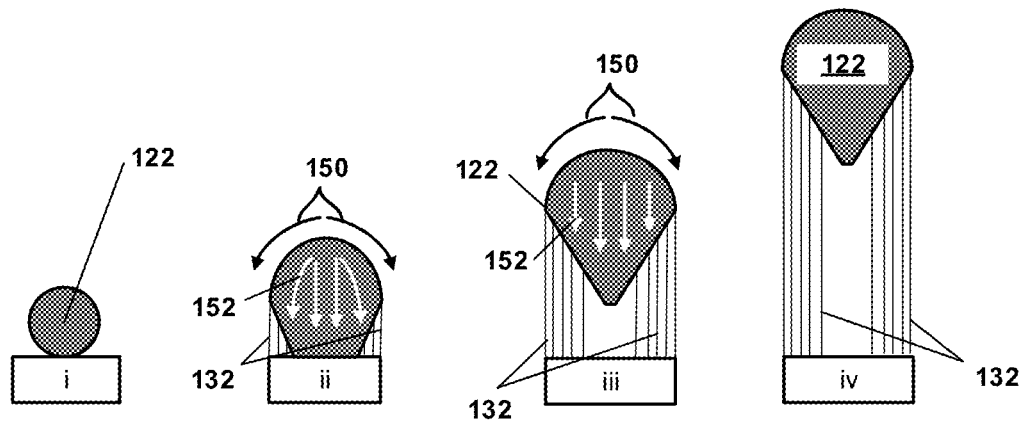
FIG. 3 shows an example of a growth mechanism for forming axial geometry carbon structures with a catalytic nanoparticle in accordance with certain aspects of the present disclosure.
Figure 4:
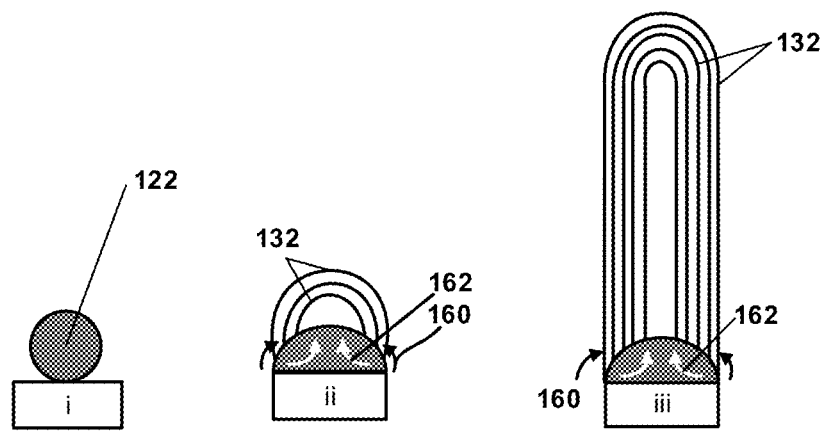
FIG. 4 shows another example of a growth mechanism for forming axial geometry carbon structures with a catalytic nanoparticle in accordance with certain other aspects of the present disclosure.

By way of non-limiting example, with reference to FIGS. 3 and 4, two distinct growth mechanisms for carbon from the catalytic nanoparticles 122 to form the plurality of axial geometry carbon structures 132 are shown. In FIG. 3, (i) designates the catalytic nanoparticle 122 that may be disposed in a reducing atmosphere (as discussed further below), which may comprise one or more hydrocarbons ($C_xH_y$). Growth of the carbon structures 132 begins at (ii), where carbon will dissolve into certain crystal facets of the metal catalyst. When a concentration of carbon (C) atoms in the catalyst is saturated, at the certain catalytic nanoparticle surfaces 122 carbon precipitates at 150 and moves outward at arrow 152 to facilitate carbon growth along a lower region of the catalytic nanoparticle 122. The catalytic nanoparticle thus facilitates precipitation of carbon to grow a plurality of axial geometry carbon structures. Hydrogen gas may be released as the reaction and precipitation occurs. In (iii), the carbon structures 132 continue to grow and gain height as the catalytic nanoparticle 122 is forced upwards, so that in (iv), a final axial geometry carbon structure 132 is formed. Notably, such an axial geometry carbon structure 132 may be formed in pores of the carbonaceous matrix during or after the pyrolysis.

An alternative growth mechanism in shown in FIG. 4. The catalytic nanoparticle 122 in (i) may be disposed in a reducing atmosphere, where one or more hydrocarbons ($C_xH_y$) are present. Growth of the carbon structures 132 begins at (ii), where a reaction occurs at the catalytic nanoparticle 122 so that carbon precipitates at 160 over the upper surface of the catalytic nanoparticle 122 and moves outward at arrow 162 to facilitate carbon growth over the catalytic nanoparticle 122. Again, hydrogen may be released during the reaction. The carbon structures 132 grow and gain height over the catalytic nanoparticle 122, so that in (iii), a final axial geometry carbon structure 132 is formed. Notably, such an axial geometry carbon structure 132 may be formed in pores of the carbonaceous matrix during or after the pyrolysis.

The methods according to certain aspects of the present disclosure may include pyrolyzing the electrode at a temperature of greater than or equal to about 500° C. to grow the plurality of axial geometry carbon structures (CNTs/CNFs) in the electrode while in a controlled reducing atmosphere. In other aspects, the plurality of axial geometry carbon structures can also grow in an atmosphere with hydrocarbon gases after the pyrolysis process of the carbon-based polymeric precursor is completed.

In certain aspects, the electrode comprises greater than or equal to about 30% by weight to 90% by weight of electroactive particles in the electrode, greater than 0% by weight to less than or equal to about 10% by weight of the axial geometry carbon structures in the electrode, greater than 0% by weight to less than or equal to about 5% by weight of the catalytic nanoparticles in the electrode, and a balance of electrically conductive carbonaceous matrix material, such as for example, greater than or equal to about 2% by weight to 20% by weight of the electrically conductive carbonaceous matrix material.

The electrode may have an overall porosity after the formation process of greater than or equal to about 10% to less than or equal to about 50% in certain variations.

In certain aspects, the plurality of electroactive particles has an average particle size diameter of greater than or equal to about 50 nm to 20 micrometers (μm) and the plurality of catalytic nanoparticles has an average particle size diameter of greater than or equal to about 2 nm to less than or equal to about 100 nm. In this manner, the electrode formed by such a method includes an electrically conductive carbonaceous porous network comprising the plurality of electroactive particles and the plurality of axial geometry carbon structures. The axial geometry carbon structures are formed in localized regions initiated by the catalytic nanoparticles that were evenly distributed within the precursor slurry, so that the axial geometry carbon structures are distributed substantially evenly within the electrode. The negative electrode thus formed has significantly improved capacity retention, fast charge capability where a silicon-containing active material is used, and good mechanical integrity/diminished mechanical degradation to provide a robust electrode capable of withstanding volumetric changes of the electroactive material over many cycles of lithiation and delithiation.

As noted above, in certain variations, aside from the plurality of catalytic nanoparticles, the slurry used to make the electrode is substantially free of electrically conductive particles. In certain alternative variations, additional electrically conductive materials may be included in the precursor slurry, such as carbon-based material or conductive polymers, which may be processed to form the electrode. Carbon-based materials may include by way of example, carbon particles of KETCHEN™ black, DENKA™ black, acetylene black, carbon black, and the like. The carbon-based materials may be incorporated into the electrode. The conductive polymers may be at least partially pyrolyzed during heating. Examples of a conductive polymer include polyaniline, polythiophene, polyacetylene, polypyrrole, and the like.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of forming a plurality of axial geometry carbon structures in situ in an electrode for an electrochemical cell that cycles lithium ions, the method comprising:
    mixing a plurality of electroactive particles that undergo volumetric expansion within the electrode as the electrochemical cell cycles lithium ions, a polymer precursor, and a plurality of catalytic nanoparticles comprising a metal selected from the group consisting of: iron, nickel, cobalt, alloys, and combinations thereof to form a substantially homogeneous slurry;
    applying the slurry to a substrate; and
    heating the slurry in an environment having a temperature of less than or equal to about 895° C. to pyrolyze the polymer precursor so that the plurality of catalytic nanoparticles facilitates precipitation of carbon to grow a plurality of axial geometry carbon structures, wherein after the heating, the electrode includes an electrically conductive carbonaceous porous network comprising the plurality of electroactive particles and the plurality of axial geometry carbon structures.

2. The method of claim 1, wherein the temperature is greater than or equal to about 500° C. to less than about 700° C.

3. The method of claim 1, further comprising cross-linking or curing the polymer precursor after the applying, but prior to the heating.

4. The method of claim 3, wherein the cross-linking or curing is performed at a temperature of greater than or equal to about 30° C. to less than about 300° C.

5. The method of claim 3, wherein the cross-linking or curing includes exposing the polymer precursor to actinic radiation (UV light) or e-beam energy.

6. The method of claim 1, wherein aside from the plurality of catalytic nanoparticles, the slurry is substantially free of electrically conductive particles.

7. The method of claim 1, wherein the electroactive particles comprise silicon.

8. The method of claim 7, wherein the electroactive particles comprise an electroactive material selected from the group consisting of: Si, SiSn, SiSnFe, SiSnAl, SiFeCo, $SiO_x$, and combinations thereof.

9. The method of claim 1, wherein the plurality of catalytic nanoparticles comprises a transition metal salt selected from the group consisting of: $FeSO_4$, $FeC_{13}$, $Fe(NO_3)$, $FeMoO_4$, $Fe(ClO_4)_2$, $Fe_4(P_2O_7)_3$, $NiSO_4$, $NiCl_3$, $Ni(ClO_4)_2$, $CoCl_2$, $CoSO_4$, $Co_3(PO_4)_2$, $CoF_3$, $Co(ClO_4)_2$, and combinations thereof.

10. The method of claim 1, wherein the plurality of catalytic nanoparticles comprises iron.

11. The method of claim 1, wherein the environment is a reducing atmosphere comprising a hydrocarbon.

12. The method of claim 11, wherein the reducing atmosphere comprises methane or acetylene.

13. The method of claim 1, wherein the plurality of axial geometry carbon structures comprise a structure selected from the group consisting of: carbon fibers, carbon nanotubes, and combinations thereof.

14. The method of claim 1, wherein the electrically conductive carbonaceous porous network comprises greater than or equal to about 30% by weight to 90% by weight of electroactive particles and greater than 0% by weight to less than or equal to about 10% by weight of the axial geometry carbon structures.

15. The method of claim 1, wherein the plurality of electroactive particles has an average particle size diameter of greater than or equal to about 50 nm to 20 micrometers and the plurality of catalytic nanoparticles has an average particle size diameter of greater than or equal to about 2 nm to less than or equal to about 100 nm.

16. The method of claim 1, wherein the substrate comprises a current collector.

17. The method of claim 1, wherein the plurality of axial geometry carbon structures have an aspect ratio of greater than or equal to 100.

18. The method of claim 17, wherein the aspect ratio is greater than or equal to 1,000.

19. A method of forming a plurality of axial geometry carbon structures in situ in an electrode for an electrochemical cell that cycles lithium ions, the method comprising:

mixing a plurality of electroactive particles that undergo volumetric expansion within the electrode as the electrochemical cell cycles lithium ions, a polymer precursor comprising polyimide, polyacrylonitrile, poly(methyl methacrylate), polyvinylidene fluoride, sodium alginate, lithium alginate, and combinations thereof, and a plurality of catalytic nanoparticles comprising a metal selected from the group consisting of: iron, nickel, cobalt, alloys, and combinations thereof to form a substantially homogeneous slurry;

applying the slurry to a substrate; and heating the slurry in an environment having a temperature of less than or equal to about 895° C. to pyrolyze the polymer precursor so that the plurality of catalytic nanoparticles facilitates precipitation of carbon to grow a plurality of axial geometry carbon structures, wherein after the heating, the electrode includes an electrically conductive carbonaceous porous network comprising the plurality of electroactive particles and the plurality of axial geometry carbon structures.

* * * * *